(12) United States Patent
Rastegar et al.

(10) Patent No.: US 7,701,120 B2
(45) Date of Patent: Apr. 20, 2010

(54) PIEZOELECTRIC GENERATORS FOR MUNITIONS FUZING AND THE LIKE

(75) Inventors: Jahangir S. Rastegar, Stony Brook, NY (US); Thomas Spinelli, East Northport, NY (US)

(73) Assignee: Omnitek Partners LLC, Bayshore, NY (US)

( * ) Notice: Subject to any disclaimer, the term of this patent is extended or adjusted under 35 U.S.C. 154(b) by 217 days.

(21) Appl. No.: 11/998,925

(22) Filed: Dec. 3, 2007

(65) Prior Publication Data

US 2008/0129151 A1 Jun. 5, 2008

Related U.S. Application Data

(60) Provisional application No. 60/872,248, filed on Dec. 2, 2006.

(51) Int. Cl.
*H01L 41/08* (2006.01)

(52) U.S. Cl. .................................... 310/339; 310/329
(58) Field of Classification Search ................ 310/329, 310/339
See application file for complete search history.

(56) References Cited

U.S. PATENT DOCUMENTS

| 3,179,823 | A | * | 4/1965 | Nesh | 310/329 |
| 3,819,963 | A | * | 6/1974 | Kondo et al. | 310/339 |
| 3,967,141 | A | * | 6/1976 | Gawlick et al. | 310/339 |
| 4,075,525 | A | * | 2/1978 | Birchall | 310/329 |
| 4,941,243 | A | * | 7/1990 | Cleveland | 29/25.35 |
| 5,155,408 | A | * | 10/1992 | Takeuchi | 310/339 |
| 6,655,211 | B1 | * | 12/2003 | Schmid et al. | 73/514.34 |

* cited by examiner

*Primary Examiner*—Mark Budd

(57) ABSTRACT

A method for generating power from acceleration of a device is provided. The method including: applying a force to a piezoelectric member due to the acceleration; and sustaining a strain in the piezoelectric member resulting from the applied force so as to increase a time of power output from the piezoelectric member. The device can be a munition.

6 Claims, 15 Drawing Sheets

PIEZOELECTRIC GENERATORS FOR MUNITIONS FUZING AND THE LIKE

CROSS-REFERENCE TO RELATED APPLICATION

This application claims the benefit of provisional application Ser. No. 60/872,248 filed on Dec. 2, 2006, the contents of which is incorporated herein by reference.

BACKGROUND OF THE INVENTION

1. Field of the Invention

The present invention relates generally to piezoelectric generators and, more particularly, to piezoelectric generators for munitions fuzing.

2. Prior Art

All existing and future smart and guided gun-fired munitions and mortars that are equipped with electronics for fuzing or other similar purposes require electric power for their operation. The amount of power required for proper operation of certain components in gun-fired munitions, for example for the operation of certain fuzing electronics, is small enough to be provided by harvesting the electric charge generated directly from piezoelectric elements due to the firing acceleration induced straining. The advantage of using piezoelectric elements that can generate electric energy is that it eliminates the need for a primary battery and its related safety and shelf life problems. In general, such piezoelectric generators that harvest mechanical energy during the firing acceleration provide a very high degree of safety in munitions since they provide electrical energy that could operate onboard electronics only post firing. The use of reserve batteries for such very low power requirements is not cost effective and requires the allocation of valuable space and may face safety issues.

Current applications of piezoelectric elements of various designs and configurations such as stacks of piezoelectric ceramic, film layers, etc., which are loaded (strained) due to the firing acceleration in the axial direction, in bending, etc., and which may be equipped with appropriate inertial components to increase the generated loads (axial, bending, torsional, etc.), or are equipped with motion amplifying mechanisms to amplify the applied stains, have a common shortcoming that reduces their effectiveness as electrical energy generators and prevents efficient collection and storage of the generated charges. This shortcoming stems from the fact that during firing, the piezoelectric element is subjected to a very high level of acceleration induced impact type of forces during a very short period of time, in many cases of the order of one-tenth of a millisecond. As a result, the window for extraction and storage of the generated electrical charge is equally small, making efficient harvesting of the generated charge very difficult. The harvested charge is generally intended to be stored in a storage device such as a capacitor or used directly or conditioned to power a certain load.

A need therefore exists for new methods and devices that allow the aforementioned charges generated by piezoelectric elements due to the firing acceleration or other similar impact forces to be harvested over significantly longer periods of time, thereby allowing the generated charges to be harvested with significantly higher efficiency.

In addition, a need exists for new methods and devices that allow efficient harvesting of the aforementioned generated charges.

SUMMARY OF THE INVENTION

An objective of the present invention is to provide new methods for the development of devices that would allow firing acceleration and or other similar impact force induced charges generated in piezoelectric elements to be sustained for periods of times that are significantly longer than the duration of the firing acceleration or other similar impact forces.

An additional objective of the present invention is to provide a number of devices for implementing the aforementioned method to piezoelectric generators designed to generated charges due to the firing acceleration in munitions and other impact induced forces to significantly increase the amount of time available to harvest the generated charges.

Accordingly, a piezoelectric generator for generating power from an acceleration is provided. The piezoelectric generator comprising: a piezoelectric member capable of producing an output power; means for applying a force to the piezoelectric member due to the acceleration; and means for sustaining a strain in the piezoelectric member resulting from the applied force.

The piezoelectric member can comprise two or more layers of piezoelectric material. The two or more layers of piezoelectric material can be arranged in a direction of the acceleration. The two or more layers of piezoelectric material can be arranged orthogonal to a direction of the acceleration.

The means for applying a force to the piezoelectric member can comprises a mass disposed to compress the piezoelectric member upon the acceleration.

The piezoelectric generator can further comprise an elastic means for providing elasticity to one or more members acting to apply the force to the piezoelectric member.

The means for sustaining a strain in the piezoelectric member can comprise configuring two or more components to have a locking frictional fit which is engaged upon the application of the force to the piezoelectric member. The two or more components can comprise: a mass disposed to compress the piezoelectric member upon the acceleration, the mass having at least a first angled surface; and a locking member having at least a second angled surface in sliding contact with the first angled surface such that the mass and locking member engage to limit relative motion therebetween. At least the mass can be cylindrical having an internal opening. The locking member cam be cylindrical having an internal opening common with the internal opening of the mass. The two or more components can comprise: a mass disposed to compress the piezoelectric member upon the acceleration, the piezoelectric material having at least a first angled surface; and a locking member having at least a second angled surface in sliding contact with the first angled surface such that the piezoelectric member and locking member engage to limit relative motion therebetween.

The means for sustaining a strain in the piezoelectric member can comprise configuring two or more components to have an interference with each other which is engaged upon the application of the force to the piezoelectric member. The two or more components can comprise: a mass disposed to compress the piezoelectric member upon the acceleration; and a locking member having a portion for engaging the mass to limit relative motion therebetween.

The means for sustaining a strain in the piezoelectric member and the means for applying a force to the piezoelectric member can comprise a rotatable cam member having a cam surface, wherein the cam rotates upon the acceleration such that the cam surface directly or indirectly contacts with the piezoelectric member to apply the force thereto and to limit any further relative movement between the surface and piezoelectric member. The piezoelectric generator can further comprise a mass eccentrically located from an axis of rotation of the cam for increasing an amount of the applied force on the piezoelectric member. The piezoelectric generator can further comprise an intermediate member disposed between the cam surface and the piezoelectric member.

The piezoelectric generator can further comprise circuit means for recovering power from the piezoelectric material after application of the force. The circuit means can comprise an oscillatory circuit.

Also provided is a method for generating power from an acceleration. The method comprising: applying a force to a piezoelectric member due to the acceleration; and sustaining a strain in the piezoelectric member resulting from the applied force so as to increase a time of power output from the piezoelectric member.

The sustaining can comprise sustaining 90% or more of the maximum power from the piezoelectric member due to the application of the force after 55 msec from the maximum power.

BRIEF DESCRIPTION OF THE DRAWINGS

These and other features, aspects, and advantages of the apparatus of the present invention will become better understood with regard to the following description, appended claims, and accompanying drawings where:

DETAILED DESCRIPTION OF THE PREFERRED EMBODIMENT

Although this invention is applicable to numerous and various types of devices, it has been found particularly useful in the environment of generating power aboard munitions due to a firing acceleration of the munition. Therefore, without limiting the applicability of the invention to generating power aboard munitions due to a firing acceleration of the munition, the invention will be described in such environment. However, those skilled in the art will appreciate that the present methods and devices can also be used in generating power in other devices, including commercial electronic devices where an acceleration, such as resulting from an induced impact (where the acceleration is negative, i.e., a deceleration), can be used to generate the power from the disclosed devices and methods. In this regard, co-pending U.S. application Ser. No. 11/447,788 is incorporated herein by reference in its entirety.

In the following, an operation of the currently available piezoelectric generators for munitions and the like that employ the firing acceleration or other similar impact induced forces to generate charges that are to be harvested, and the disclosed novel method of sustaining the generated charges is described by an example of a piezoelectric element that is intended to be axially loaded in compression (strained in compression). The disclosed method is, however, readily seen to be general and applicable to piezoelectric elements that are loaded (strained) in other modes, such as in shear; bending; torsion, and the combination of two or more of the above modes.

Figure 1:
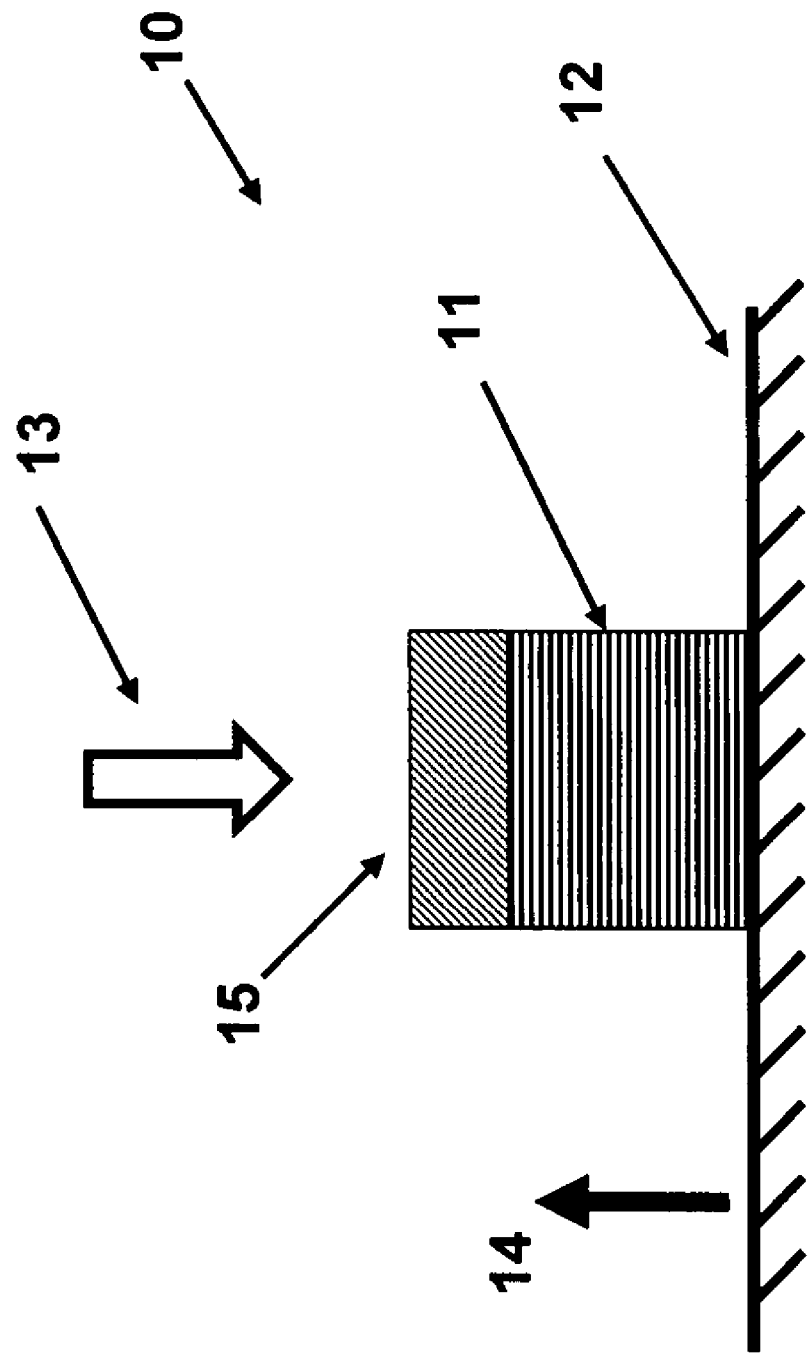
FIG. 1 illustrates an embodiment of a piezoelectric generator of the prior art.

A piezoelectric element based generator 10 is shown in FIG. 1 as attached to the structure 12 of munitions, such as in its fuzing. The piezoelectric generator 10 consists of a piezoelectric (which can be stacked of multiple layers) block 11, which is poled to generate a charge when subjected to a force in the direction of the arrow 13. It is noted that in the present description and for the sake of brevity, the term force is also intended to mean bending moment, torque and the like.

In general, stacked piezoelectric elements with relatively thin layers (stacked parallel to the base structure 12, hereinafter indicated as vertically, as shown in FIG. 1) provide a given force (pressure over the surface area of the piezoelectric stack), they would generate lower voltage levels as they would if they were constructed as a single block or with thick layered stacks. During the firing, the munitions and its structure 12 is accelerated in the direction 14, thereby generating a compressive strain on the piezoelectric stack 11, which would in turn generate an electric charge in the piezoelectric element which could then be harvested using an appropriate and well known electronic or electric circuitry (not shown). To increase the level of compressive strain in the piezoelectric stack 11, a mass 15 is attached atop the piezoelectric stack, which applies an additional compressive force (compressive strain) to the piezoelectric stack 11, proportional to the amount of mass and the magnitude of the acceleration 14. However, since the duration of the firing acceleration is very short, in many cases on the order of one-tenth of a millisecond or less, the window for extraction and storage of the electrical energy is equally small, making efficient harvesting of the generated charge very difficult.

It is noted that in general, piezoelectric elements can be subjected to compressive load (strain) and not tensile loads (strains) since piezoelectric materials are generally brittle and susceptible to cracking and are much stronger in compression than in tension. However, one can still safely subject piezoelectric elements to higher tensile forces (strains) by first preloading them in compression to eliminate the net tensile loading during its operation or reduce it to within acceptable levels.

The methods being disclosed provide the means to indefinitely sustain the aforementioned charge generating forces (strains) that are induced as a result of the firing acceleration or other similar impact forces. The sustained charges can then be harvested over the length of time necessary for their efficient collection or even left for direct use by the intended components since piezoelectric elements act as capacitors and can hold the charge for a significant length of time, which may in fact be long enough for many munitions applications due to their short flight time. It is, however, noted that in practice, piezoelectric elements like any other capacitors do suffer from certain amount of leakage depending on their quality and this issue must be considered for each particular application. It is also noted that as the induced charges are collected, the level of generated force on the piezoelectric stack is reduced, since the piezoelectric stack resistance to the applied compressive load is in part due to the generated charges and in part due to the elasticity of the piezoelectric material structure.

Mechanical means may be used to sustain or "lock" the aforementioned generated force (strain) in the piezoelectric stack 11, FIG. 1, as described below. It is noted that the embodiments selected below to describe the aforementioned mechanical means for sustaining (locking) the generated force (stain) are chosen primarily for the sake of simplifying the present description. Other embodiments are provided below.

Figure 2:
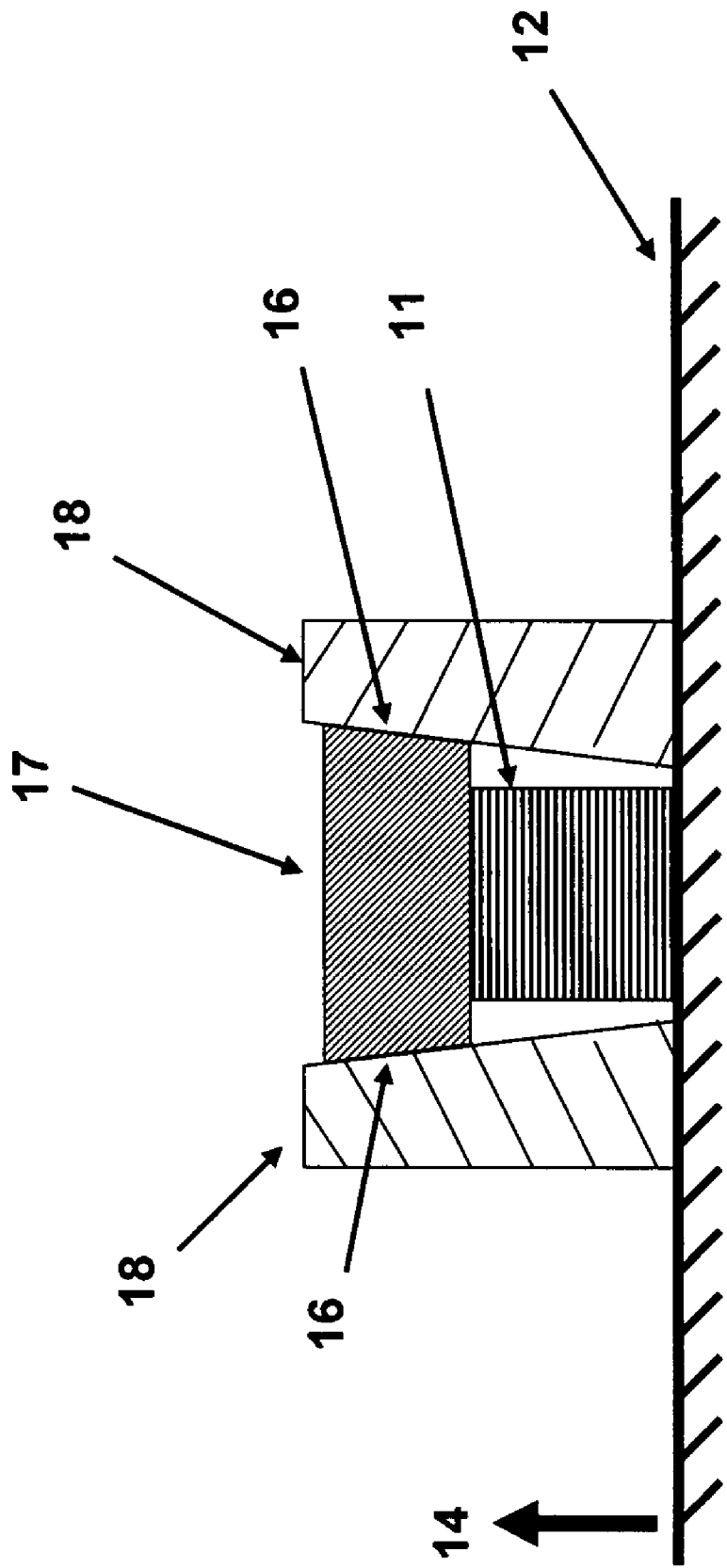
FIG. 2 illustrates an embodiment of a piezoelectric generator.

A first mechanical means functions based on friction. In devices constructed based on friction, a friction force is used to prevent the piezoelectric stack 11 to return to its unstrained condition. Such a "force (stain) locking mechanism" can, for example, be provided to the piezoelectric generator 10 by providing small angles 16 (FIG. 2) to the sides of the top mass 15 (identified with the number 17 in FIG. 2) so that as the mass displaces down due to the shortening of the piezoelectric stack 11 as a result of the firing acceleration in the direction 14, the angled sides of the mass 15 are wedged against the mating sides 18 protruding from the base structure 12, thereby preventing the mass 15 from returning to its original pre-firing position following the removal of the firing acceleration, i.e., after the munition has exited the barrel. The aforementioned wedging angle must be small enough such that the generated friction force is greater than a component of the compressive force that tends to push the mass 17 out of its locking position. The allowable wedging angle is dependent of the coefficient of friction between the contacting surfaces and its maximum amount can be readily calculated using well known relationships.

Figure 3:
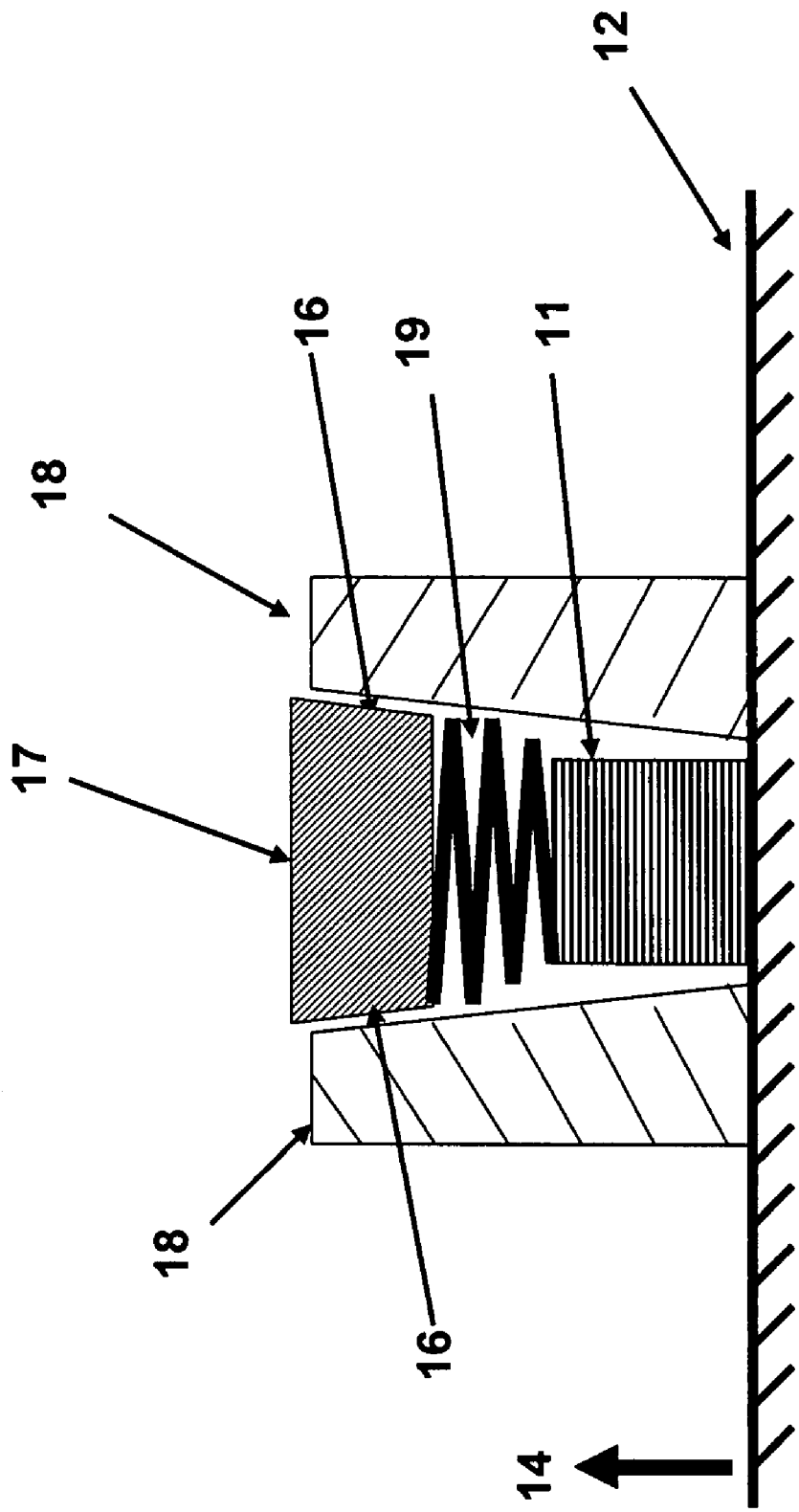
FIG. 3 illustrates a variation of the piezoelectric generator of FIG. 2

In practice, however, since the amount of strain in the piezoelectric stack, i.e., the downward travel of the mass 17, is very small and in the order of micrometers, relatively stiff springs can be added in series with the piezoelectric stack, thereby significantly increasing the length of travel of the mass 17. Such an arrangement is shown in FIG. 3, in which the spring 19 is added between the mass 17 and the piezoelectric stack 11 to significantly increase the total downward travel of the mass 17 as a result of the firing acceleration in the direction 14. As a result, the level of compressive force that is achieved on the piezoelectric stack 11 is more predictable and a slight movement of the wedge mass 17 would not cause a significant portion of the compressive force to be lost.

Figure 4:
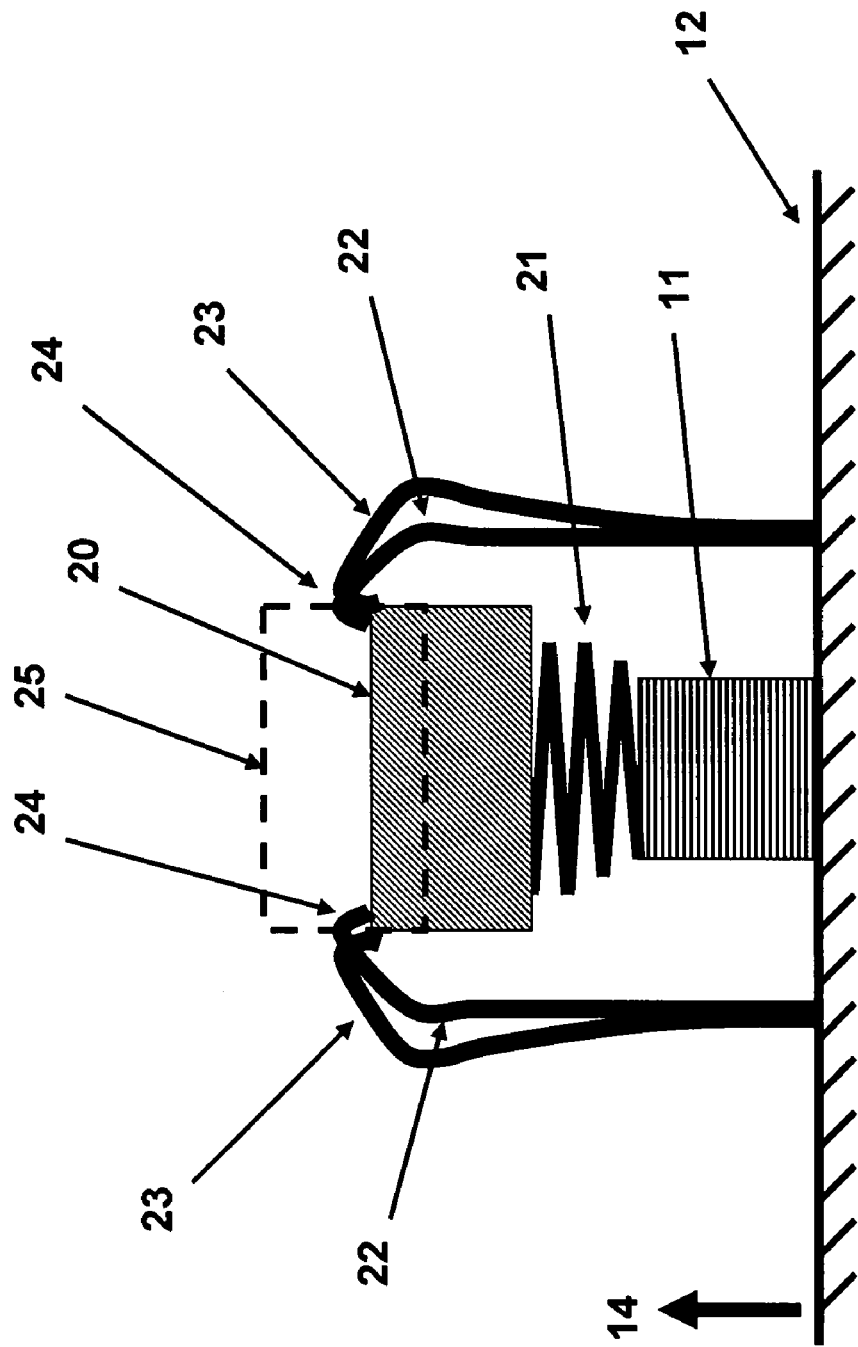
FIG. 4 illustrates another embodiment of a piezoelectric generator.

A second mechanical means functions as a locking mechanism that is based on geometrical interference between appropriate parts of the locking mechanism to prevent the piezoelectric stack 11 from returning to its pre-firing (unstrained) configuration, thereby sustaining the generated force (strain) that is applied to the piezoelectric stack 11 as a result of the firing acceleration in the direction 14 or other similar impact forces. Such a locking mechanism is shown in the schematic of FIG. 4. In this embodiment, the mass 20 is attached to the piezoelectric stack 11 via a spring 21 to allow a significant displacement of the mass 20 as a result of the firing acceleration in the direction of the arrow 14 for the reason described for the embodiment shown schematically in FIG. 3. In its pre-firing position, the mass 20 is in the position 25 shown with dashed lines. At least one locking element 22 is provided and is initially in the position 23 (not engaged with mass 20), thereby allowing vertical motion of the mass 22 (about its position 25). It is noted that the locking elements 22 are provided with elastic elements that bias their locking tips 24 to move towards their locking position 22. It is also noted that in the schematic of FIG. 4, the locking element is shown to be constructed as a single element with bending flexibility. However, in general, the locking mechanism may be constructed with any mechanism type that would provide the desired movement towards the indicated locking position with at least one elastic element (which may be an integral part of the mechanism structure) to bias its movement towards the aforementioned locking position. As a result of firing, the munitions structure 12 is accelerated in the direction 14, thereby forcing the mass 20 to move downward towards the piezoelectric stack 11. As the mass 20 moves down, at a desired position, i.e., at a desired level of force being applied to the piezoelectric element by the spring 21, the tips 24 of the locking element move into their locking position, thereby allowing the locking elements 22 to move from their positions 23 to the positions 22 to engage and lock the mass 20. The mass is thereby locked in its position 20, thereby "locking" the force applied by the spring 21 onto the piezoelectric element 11.

The above two methods of sustaining the generated force (strain) in the piezoelectric element 11 may also be combined. In such embodiments, the aforementioned geometrical interference type mechanisms provides the means to ensure that if friction forces do not sustain the generated strain, for example due to the generally present vibratory oscillations of the munitions platform, then a secondary means is provided to ensure the proper operation of the device.

Figure 5:
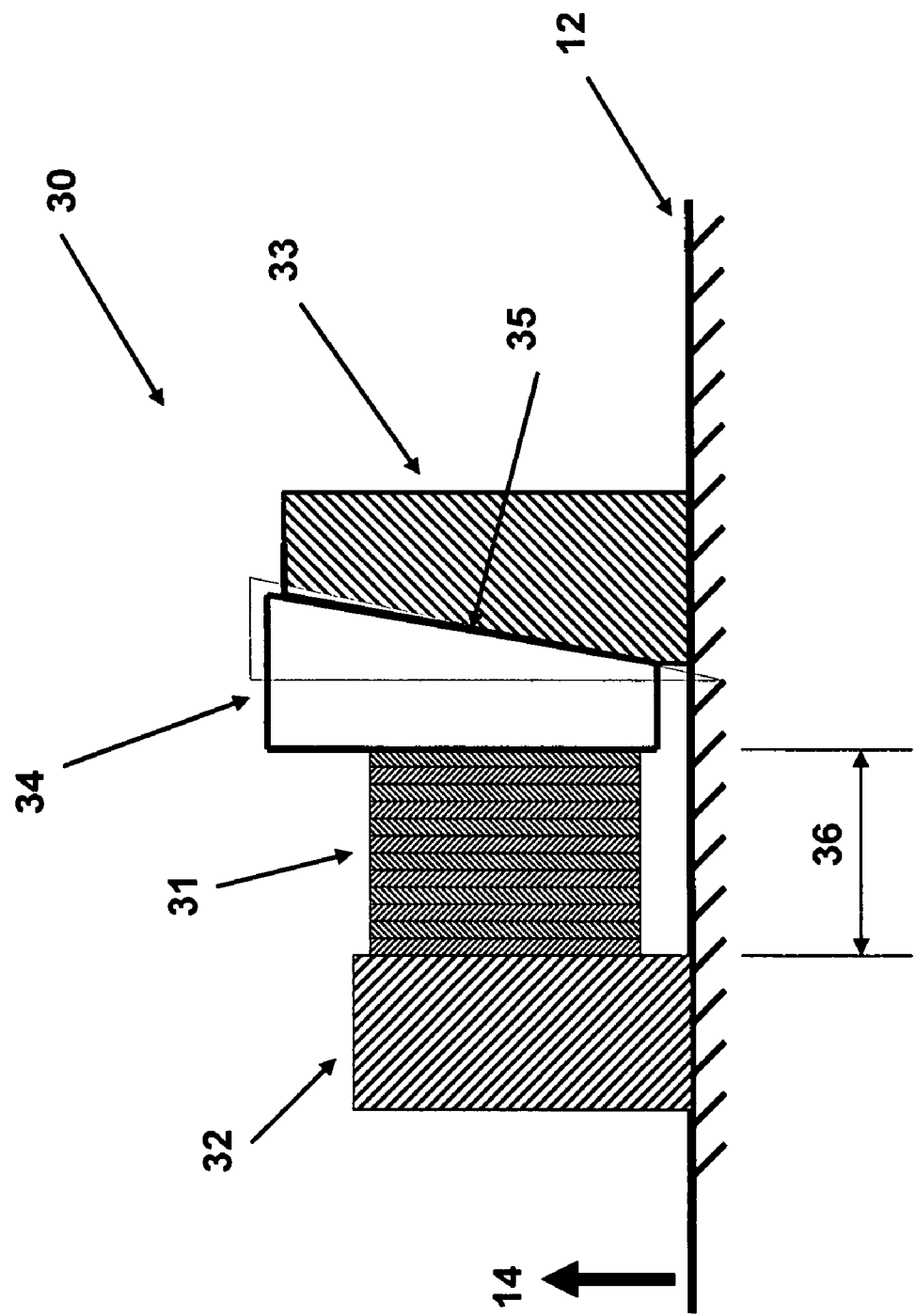
FIG. 5 illustrates another embodiment of a piezoelectric generator.

One embodiment 30, based on friction forces alone to sustain the generated force (strain) in the piezoelectric stack 31, is shown in the schematic of FIG. 5. In this embodiment, the long axis of the piezoelectric stack 31 is positioned perpendicular to the direction of the firing acceleration 14. To generate a charge, the piezoelectric stack 31 should therefore be compressed to reduce its length 36, i.e., a compressive force has to be applied to the piezoelectric stack in the direction perpendicular to the direction of the firing acceleration 14. The applied force (strain) should also be sustained post the firing event. To this end, the piezoelectric stack 31 is fixed on one end to a support 32, which is fixed to the structure of the munition 12. On the opposite side of the piezoelectric stack 31, another support 33 is fixed to the structure of the munitions 12. The side 35 of the support 33 facing the piezoelectric stack 31 is inclined with a relatively small angle. A matching wedging block 34 with an appropriate mass is positioned between the piezoelectric stack 31 and the support 33. During the firing, the firing acceleration in the direction 14 acts on the mass of the block 34, pushing it downwards, and exerting a compressive force on the piezoelectric stack 31. With an appropriate wedging angle of the surface 35, the wedging block is locked in place post firing due to the generated friction forces. The compressive force (strain) acting on the piezoelectric stack 31 is thereby sustained. The compressive force (strain) acting on the piezoelectric stack 31 generates an electric charge in the piezoelectric stack layers, which can then be harvested and stored in certain storage device such as a capacitor or used directly to power, for example, certain electronic or electric devices. One advantage of the present embodiment in munitions is that in general, a relatively long piezoelectric stack 31 may be used in the device without making the device very tall.

In an alternative embodiment of the device shown in FIG. 5, at least one elastic element such as a spring washer (not shown) with relatively high spring rates is positioned between the piezoelectric stack 31 and the support 32 and/or the piezoelectric stack 31 and the wedge 34 to increase the range of motion of the wedge for the reasons described for the embodiment shown in FIG. 3.

Figure 6:
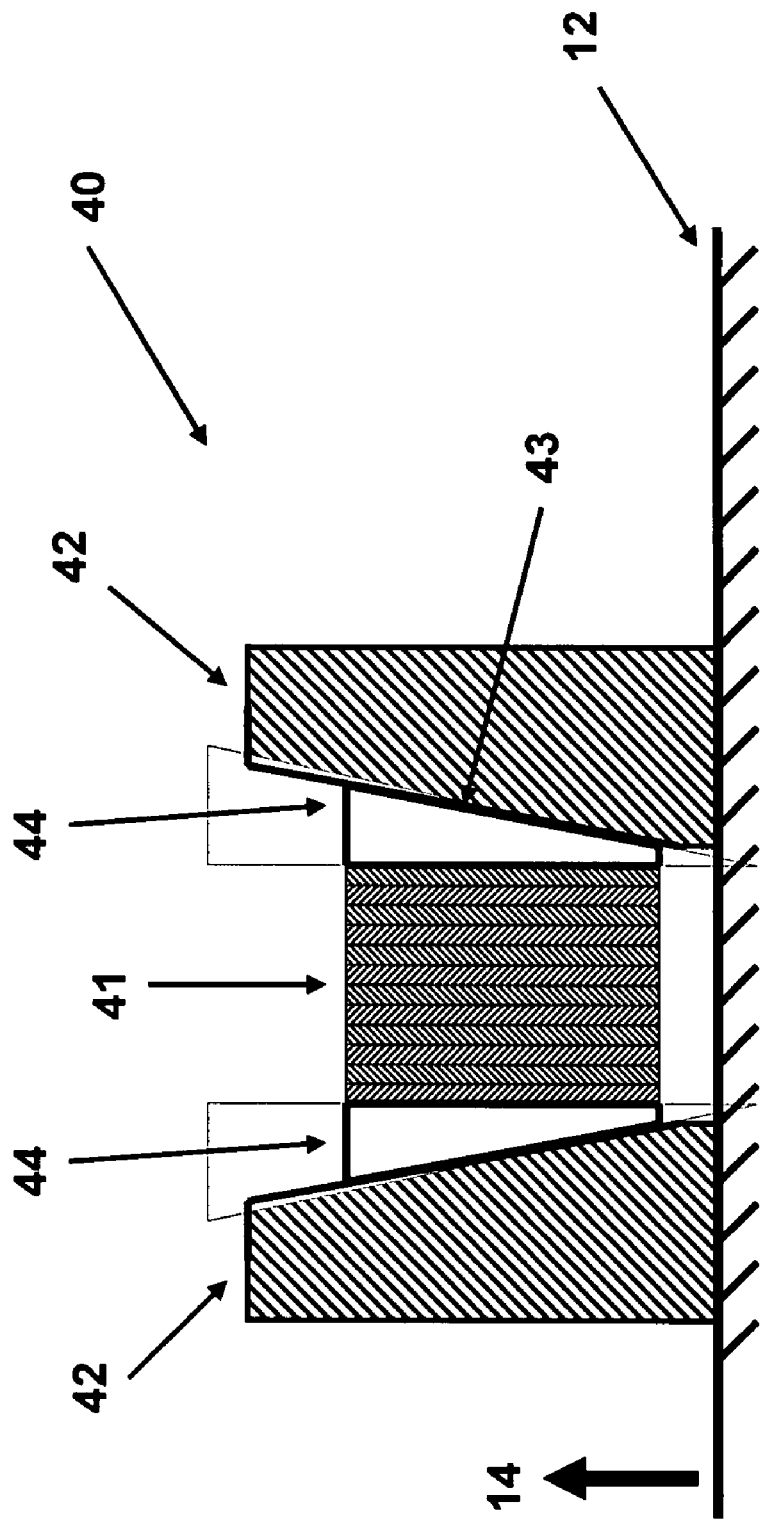
FIG. 6 illustrates another embodiment of a piezoelectric generator.

Another embodiment 40 is shown in the schematic of FIG. 6. Similar to the embodiment of FIG. 5, this embodiment is also based on friction forces alone to sustain the generated force (strain) in the piezoelectric stack 41, which is directed in the same direction as the piezoelectric stack 31 relative to the direction of acceleration 14. The blocks 44 with inclined surfaces 43 are fixed to the piezoelectric stack 41. The inclined surfaces 43 of the blocks 44 mate with the similarly inclined surfaces of the supports 42. The supports 42 are fixed to the structure of the munitions 12. During the firing, the firing acceleration in the direction 14 acts on the total mass of the piezoelectric stack 41 and the blocks 44, pushing them downwards between the blocks 42, and thereby exerting a compressive force on the piezoelectric stack 41. With an appropriate wedging angle of the surfaces 43, the assembly of the piezoelectric stack 41 and the blocks 44 is locked in place relative to the supports 42 post firing due to the generated friction forces between the inclined surfaces. The compressive force (strain) acting on the piezoelectric stack 41 is thereby sustained. The compressive force (strain) acting on the piezoelectric stack 41 generates an electric charge in the piezoelectric stack layers, which can then be harvested and stored in certain storage device such as a capacitor or used directly to power, for example, certain electronic or electric devices. It is noted that this embodiment could have been constructed with only one wedging element 41, leaving the opposite side (which can have a rectangular end element— not shown) to slide down against a straight edged support (not shown). Such an arrangement, however, may cause the piezoelectric stack assembly to rotate (about the direction perpendicular to the plane of the illustration) due to the difference in the vertical component of the friction forces acting at its two sliding surfaces. The embodiment shown in FIG. 6 can minimize the aforementioned possibility of rotation.

In an alternative embodiment shown in FIG. 6, at least one elastic element such as spring washer (not shown) with relatively high spring rates is positioned between the piezoelectric stack 41 and one or both of the support 42, and can be between the piezoelectric stack 41 and one or both of the wedges 44, to increase the range of motion of the wedge for the reasons described for the embodiment shown in FIG. 3.

Figure 7:
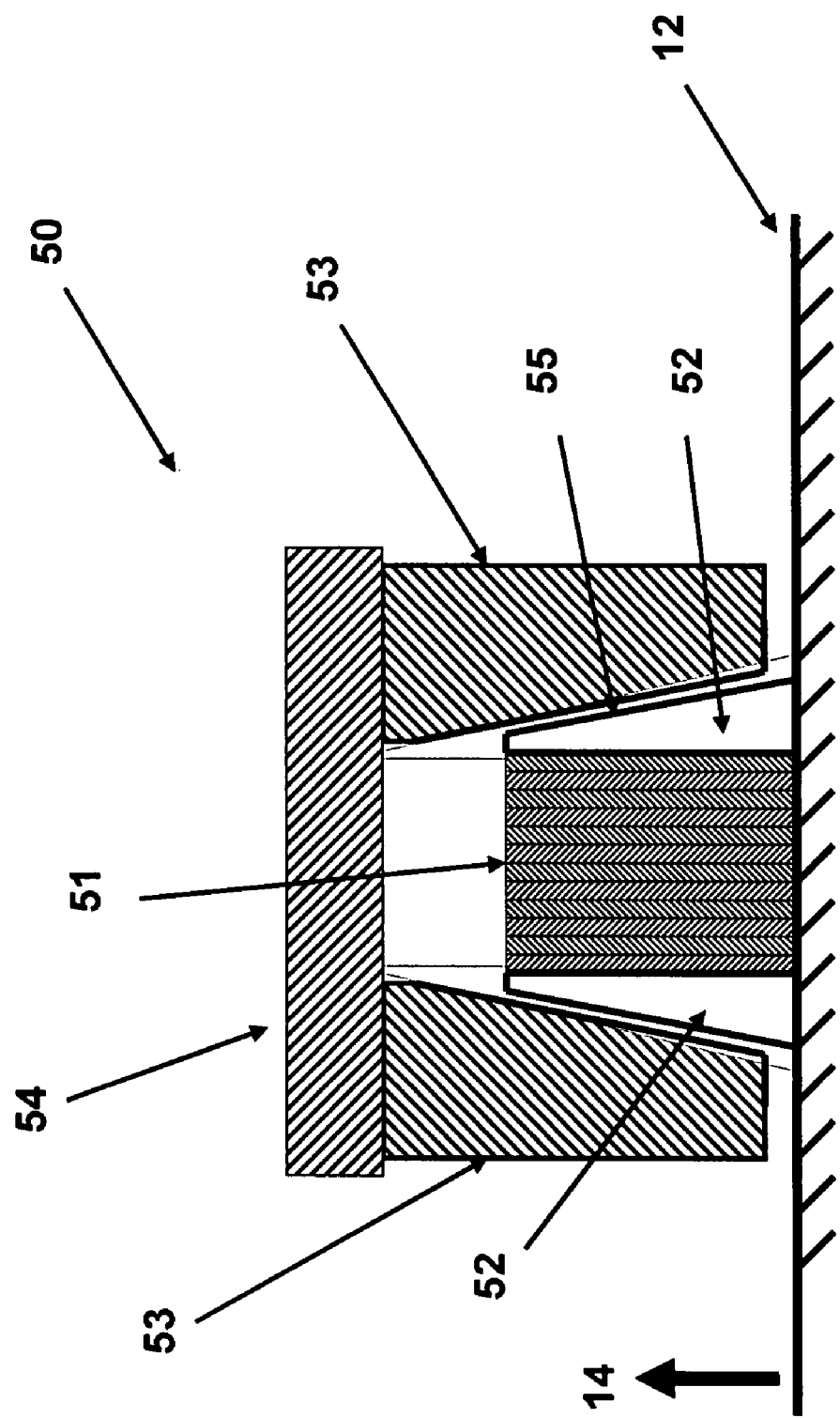
FIG. 7 illustrates another embodiment of a piezoelectric generator.

In general, the position of the traveling wedging element(s) may be exchanged. For example, in the embodiment of FIG. 6, the piezoelectric stack 41 (51 in FIG. 7) and its two sides wedging elements 44 (52 in FIG. 7) may be set against the munitions structure 12 as shown in FIG. 7. In this embodiment 50, the supports 42 (53 in FIG. 7) are then joined together by the relatively rigid backing 54, and positioned as shown in FIG. 7 over the piezoelectric stack assembly. The piezoelectric stack is held against the munitions structure surface 12, but is allowed to expand and/or contract. As the munitions is fired, the acceleration of the munitions in the direction of the arrow 14 would act on the mass of the assembly of the elements 53 and the backing 54, thereby applying a compressive force on the piezoelectric stack 51 via the side wedges 52. With an appropriate wedging angle of the surfaces 55, the assembly of the piezoelectric stack 51 and the blocks 52 is locked in place relative to the supports 53 post firing due to the generated friction forces between the inclined surfaces. The compressive force (strain) acting on the piezoelectric stack 51 is thereby sustained. The compressive force (strain) acting on the piezoelectric stack 51 generates an electric charge in the piezoelectric stack layers, which can then be harvested and stored in certain storage device such as a capacitor or used directly to power, for example, certain electronic or electric devices.

In an alternative embodiment to the embodiment shown in FIG. 7, at least one elastic element such as spring washer (not shown) with relatively high spring rates is positioned between the piezoelectric stack 51 and one or both of the elements 53, which can be between the piezoelectric stack 51 and one or both of the wedges 52, to increase the range of motion of the wedge for the reasons described for the embodiment shown in FIG. 3.

Figure 8:
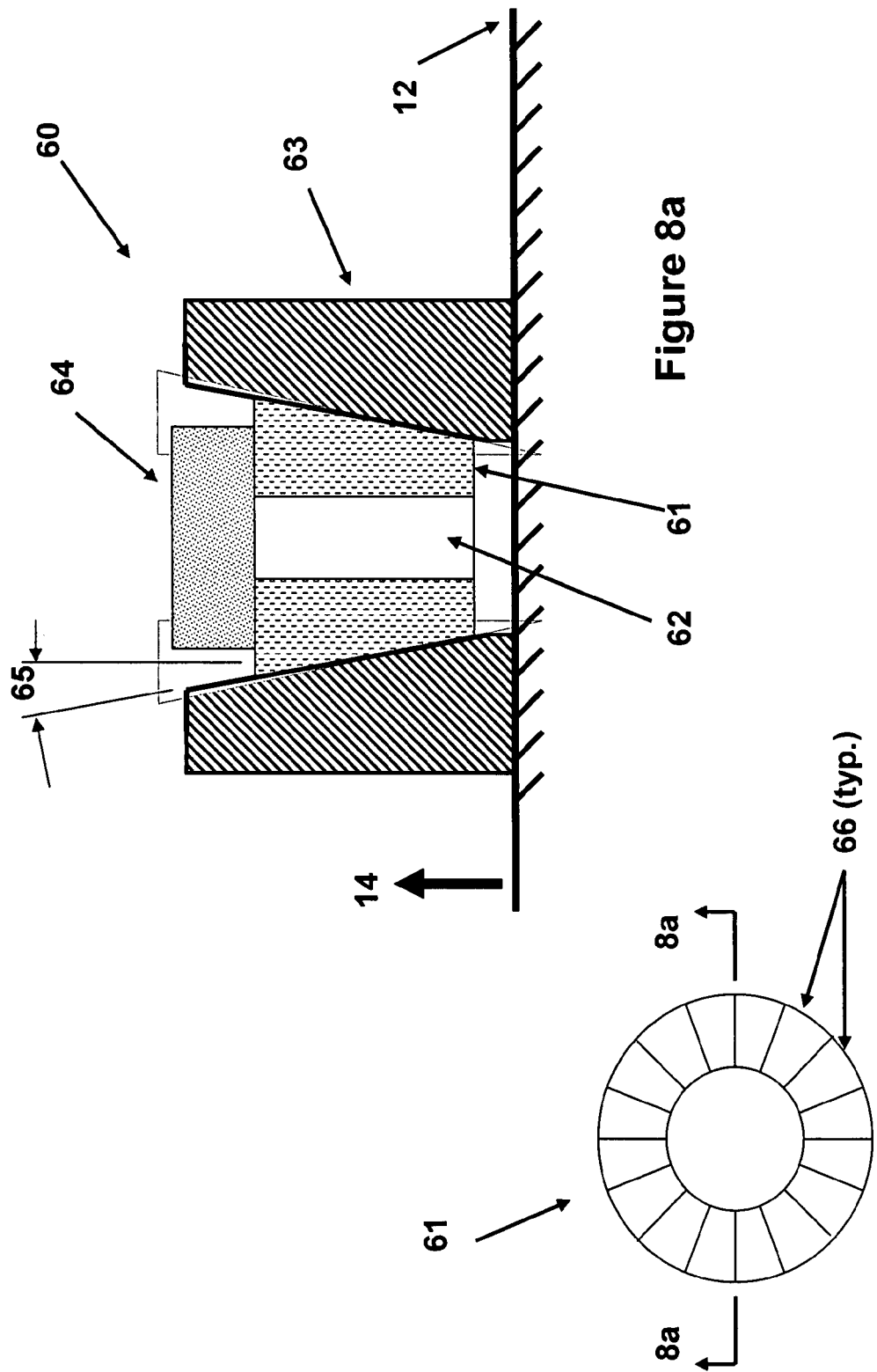
FIG. 8a illustrates a sectional view another embodiment of a piezoelectric generator as taken along line 8a-8a in FIG. 8b.

It is noted that even though in the embodiments shown in FIGS. 2-7 the piezoelectric layers are stacked in planes perpendicular to the direction of the applied compressive loads, the compressive loads may be applied to similar layers stacked in numerous other configurations. For example, in one embodiment 60, the layers 66 may be stacked to form a cone segment 61, which can have an inside hole 62 as shown in the schematic of longitudinal cross-sectional view in FIG. 8a (shown with ring 63). The layers are shown in the top view of piezoelectric element 61 in FIG. 8b (without ring 63). The cone angle is indicated as 65. A ring 63 with a matching inside cone angle is used as the support element attached to the munitions structure 12. During the firing, the firing acceleration in the direction 14 acts on the mass of the piezoelectric element 61, thereby wedging it inside the ring 63. An additional mass 64 may be used to increase the generated compressive force. With an appropriate wedging angle of the cone surfaces 65, the piezoelectric stack 61 is locked inside the ring 63 post firing due to the generated friction forces between generated by the radial forces compressing the contacting cone surfaces. The compressive force (strain) acting on the piezoelectric stack 61 is thereby sustained. The compressive force (strain) acting on the piezoelectric stack 61 generates an electric charge in the piezoelectric stack layers, which can then be harvested and stored in certain storage device such as a capacitor or used directly to power, for example, certain electronic or electric devices.

In an alternative embodiment, the piezoelectric element 61 is composed of a single (or annular layers of) piezoelectric (cone) element, which is poled in the radial direction such that its radial contraction as it is edged into the support element 63 would generate electric charge that could be harvested as described above for the embodiment of FIGS. 8a and 8b.

The embodiments shown in FIGS. 8a and 8b, the ring 63 can possess a certain amount of circumferential flexibility to increase the range of downward motion of the piezoelectric element 61 for the reasons described for the embodiment shown in FIG. 3.

In the embodiments shown in FIGS. 3-4 and the aforementioned alternatives to the embodiments shown in FIGS. 5-7 with elastic (spring) elements, the elasticity may be built into the structure of one of the elements in the line of compressive loading. For example, in the embodiment of the FIG. 3, the elasticity may be built into the structure of either the mass element 17 (in the direction of the compressive load) or one or both of the supports 18 (again in the direction of the compressive load). In the embodiment of the FIG. 4, the required elasticity of the spring element 21 may be built into the structure of the mass 20. In the embodiment of FIG. 5, the aforementioned elasticity in the direction of the piezoelectric stack 31 loading may be built into the structure of the wedge 34 and/or the support 32 and/or the support 33. In the embodiment of the FIG. 6, the aforementioned elasticity in the direction of the piezoelectric stack 41 loading may be built into the structure of the one or both wedges 44 and/or one or both of the supports 42. In the embodiment of the FIG. 7, the aforementioned elasticity in the direction of the piezoelectric stack 51 loading may be built into the structure of the one or both wedges 52 and/or one or both of the supports 53 and/or the connecting member 54.

Figure 9:
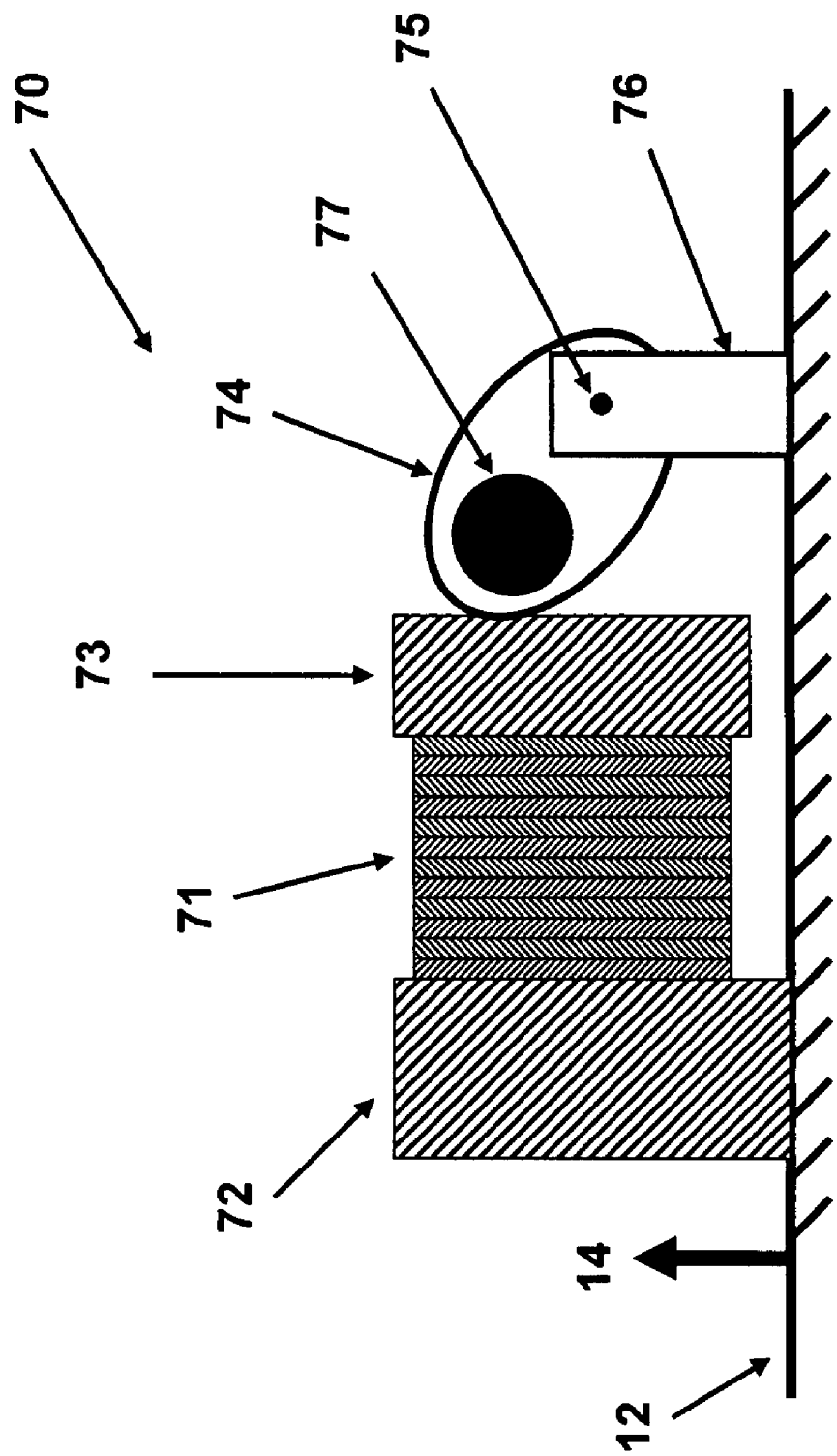
FIG. 9 illustrates another embodiment of a piezoelectric generator.

In yet another embodiment 70, the schematic of which is shown in FIG. 9, the compressive force on the piezoelectric stack 71 can be applied by a counterclockwise rotation of a cam 74, due to the firing acceleration in the direction 14 of the munitions platform 12 acting on the mass 77. The mass 77 may be an integral part of the cam 74. The piezoelectric stack 71 is directed and attached to the support 72, which is in turn fixed to the structure of the munitions 12, similar to the embodiment of FIG. 5 (with the piezoelectric stack and support numbered 31 and 32, respectively). The cam 74 is attached to the munitions structure 12 by a support 76 by a rotary joint 75, which allows it free rotation about the axis of the joint 75. The firing acceleration in the direction 14 acts on the mass 77, thereby forcing the cam 74 to rotate in the counterclockwise direction. Due to the shape of the cam 74 profile, this rotation causes a compressive force to be applied to the intermediate block 73, which would in turn apply the compressive force to the piezoelectric stack 71. The compressive force (strain) acting on the piezoelectric stack 71 generates an electric charge in the piezoelectric stack layers, which can then be harvested and stored in certain storage device such as a capacitor or used directly to power, for example, certain electronic or electric devices.

Figure 10:
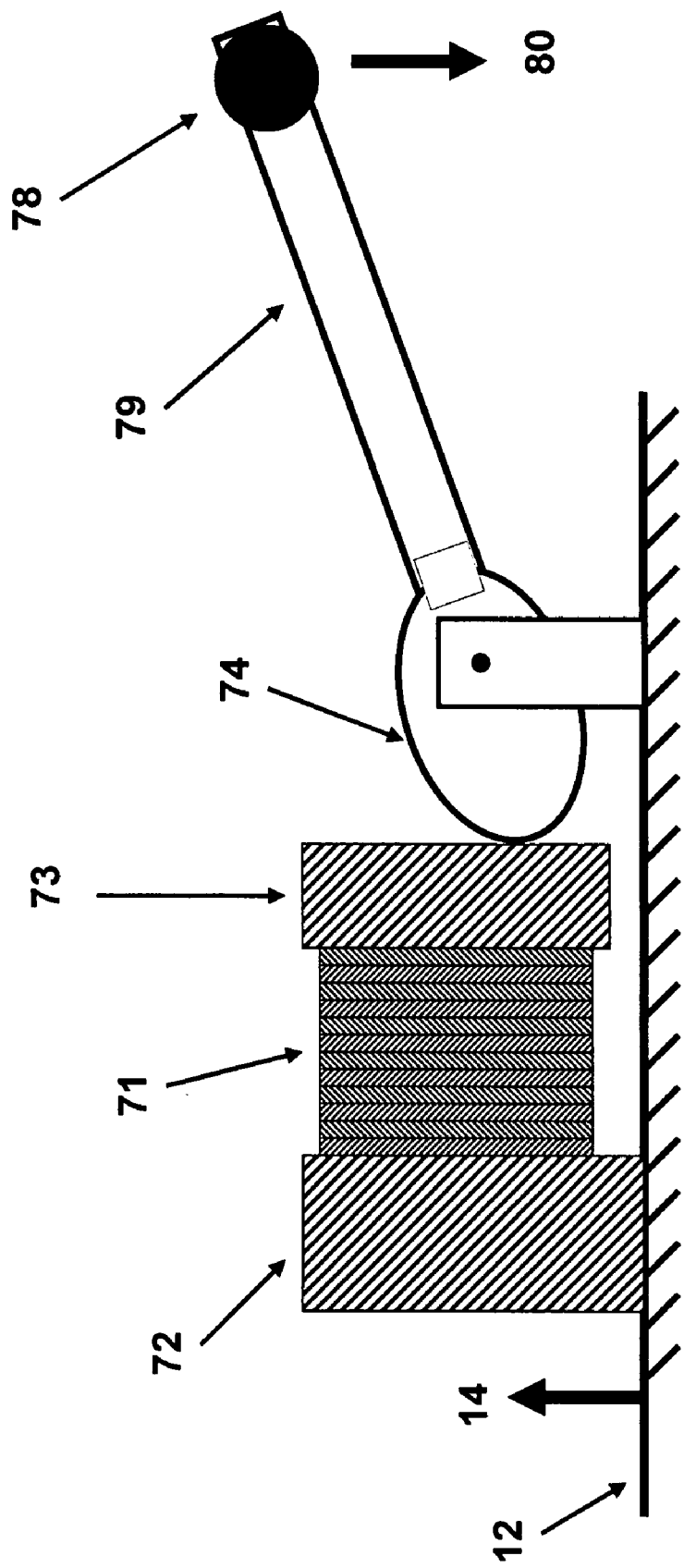
FIG. 10 illustrates a variation of the embodiment of the piezoelectric generator of FIG. 9.

In an alternative embodiment to that shown in FIG. 9, the cam 74 is positioned as shown in FIG. 10. A relatively long lever arm 77 is attached rigidly to the cam 74, to which, its far end, a mass 79 can be attached. The firing acceleration in the direction 14 acts on the mass 78 and causes it to move downwards in the direction of the arrow 80, thereby forcing the cam 74 to rotate in the clockwise direction. Due to the shape and positioning of the cam 74 profile, this rotation causes a compressive force to be applied to the intermediate block 73, which would in turn apply the compressive force to the piezoelectric stack 71. The compressive force (strain) acting on the piezoelectric stack 71 generates an electric charge in the piezoelectric stack layers, which can then be harvested and stored in certain storage device such as a capacitor or used directly to power, for example, certain electronic or electric devices.

In an alternative embodiment to that shown in FIG. 9 or 10, at least one elastic element such as spring washer (not shown) with relatively high spring rates is positioned between the piezoelectric stack 71 and the support 72 and/or between the piezoelectric stack 71 and the block 73 to increase the range of motion of the cam for the reasons described for the embodiment shown in FIG. 3. Alternatively, as it was previously described, the desired elasticity may be built into the structure of one or more of the elements 72, 73 and/or the cam assembly.

Figure 11:
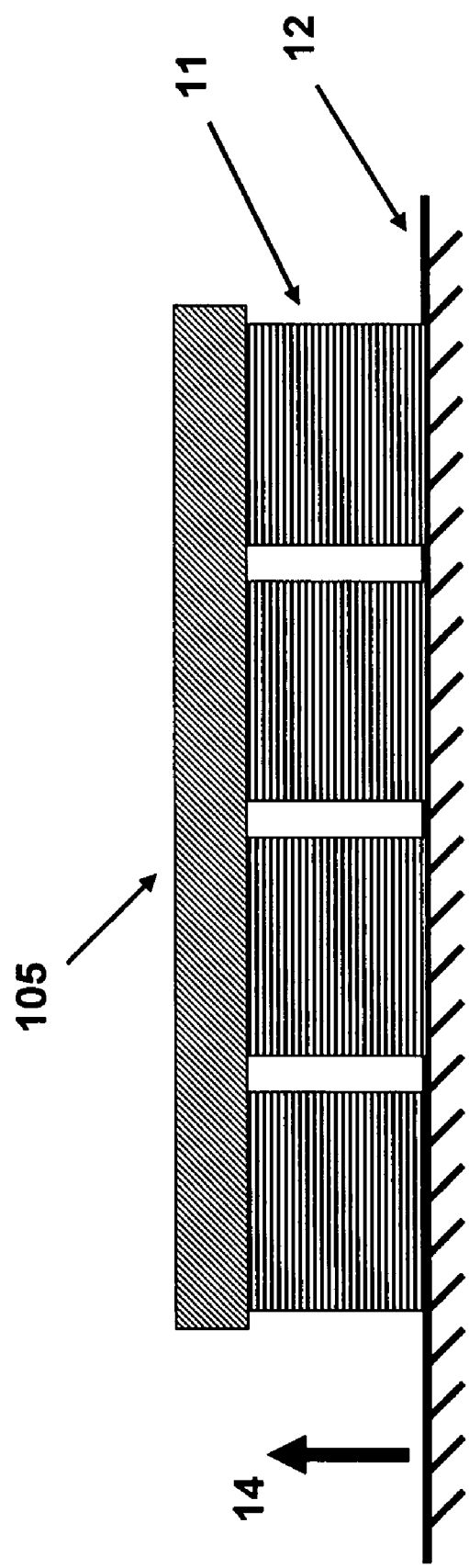
FIG. 11 illustrates a variation of the embodiment of the piezoelectric generator of FIG. 1

In yet another embodiment, a group of one or more of the aforementioned embodiments, e.g., the embodiments shown in FIGS. 1-8, may be used to form a single piezoelectric based generator. For example, as shown in the schematics of FIG. 11, more than one arrangement of piezoelectric stacks 11 may be attached to the structure 12 of the munitions, to be compressed by a single mass 101 (in place of individual masses 15 in FIG. 1), due to the acceleration of the munitions in the direction 14. Similarly, more than one arrangement of the embodiments shown in FIGS. 2-8 could be used to form a single piezoelectric based generator. For the embodiment shown in FIG. 5 (6 or 7), the only difference would be that the wedges 34 (44 or 54) are to be attached to the downward moving mass 105, FIG. 11. For the embodiment shown in FIG. 8, the only difference would be that the piezoelectric elements 61 and when present, the masses 64 are to be attached to the downward moving mass 105, FIG. 11.

Figure 12:
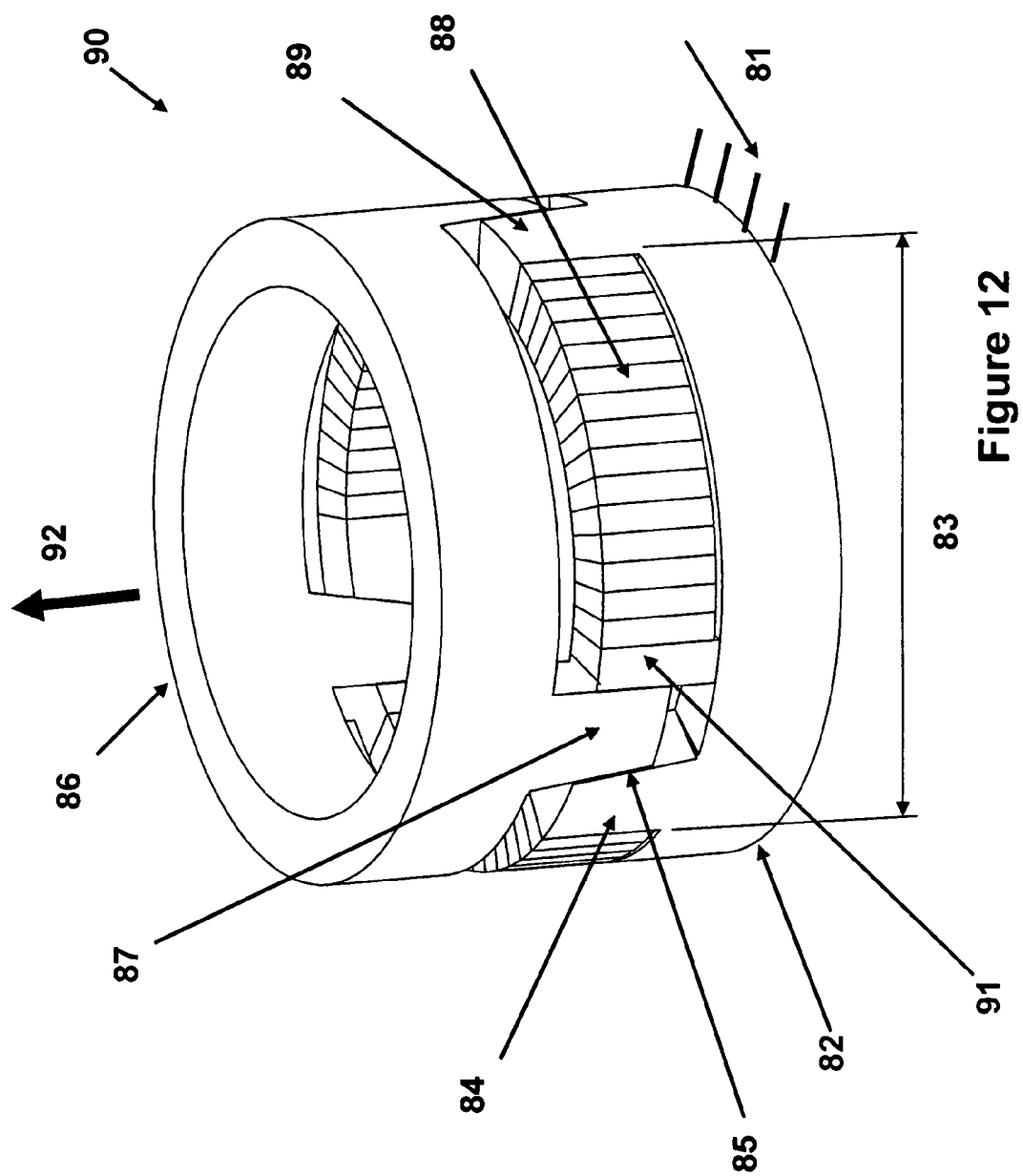
FIG. 12 illustrates another embodiment of a piezoelectric generator.

In yet another embodiment, the aforementioned more than one of the embodiments shown in FIGS. 2-8 may be configured in a variety of configurations, for example in a hollow cylindrical configuration as shown in FIG. 12. Such a configuration can be advantageous since due to the more distant and symmetrical distribution of the piezoelectric generators, the compressive force (downward motion of the upper moving part 86) becomes more uniformly distributed amount the present (preferably at least three) individual piezoelectric based generator unit. Such a configuration can be particularly advantageous in munitions applications since it leaves the most useful central volume of the munitions free for munitions specific components.

In the embodiment shown in FIG. 12, three embodiments of the piezoelectric generators shown in FIG. 5, one of which is indicated to be within the range 83, are shown to be positioned around a hollow cylindrical base 82, which is in turn attached to the munitions structure 81. Here, the piezoelectric stack layers 88 (31 in FIG. 5) are attached on one end (right side of the stack 88 within the range 83) of the support 89 (corresponding to the support 32 in FIG. 5), which can be flat and vertically oriented, and on the other end to the block 91. On the opposite side of the supports 89 are constructed with the inclined surfaces 85, with relatively small angles. The top hollow cylindrical part 86 is constructed with extending wedges 87, with one side surface flat and the opposite side surface inclined to mate at the inclined surfaces 85 of the supports 89. As the munitions structure 12 accelerates during the firing in the direction of the arrow 92, which is preferably parallel to the long axes of the cylinders 82 and 86, the firing acceleration acts on the mass of the upper hollow cylinder 86, and thereby wedging the parts 87 between the supports 84 and the blocks 91. As a result, compressive forces will be applied to the piezoelectric stacks 88. The compressive force (strain) acting on the piezoelectric stacks 88 generate electric charge in the piezoelectric stack layers, which can then be harvested and stored in certain storage device such as a capacitor or used directly to power, for example, certain electronic or electric devices.

Figure 13:
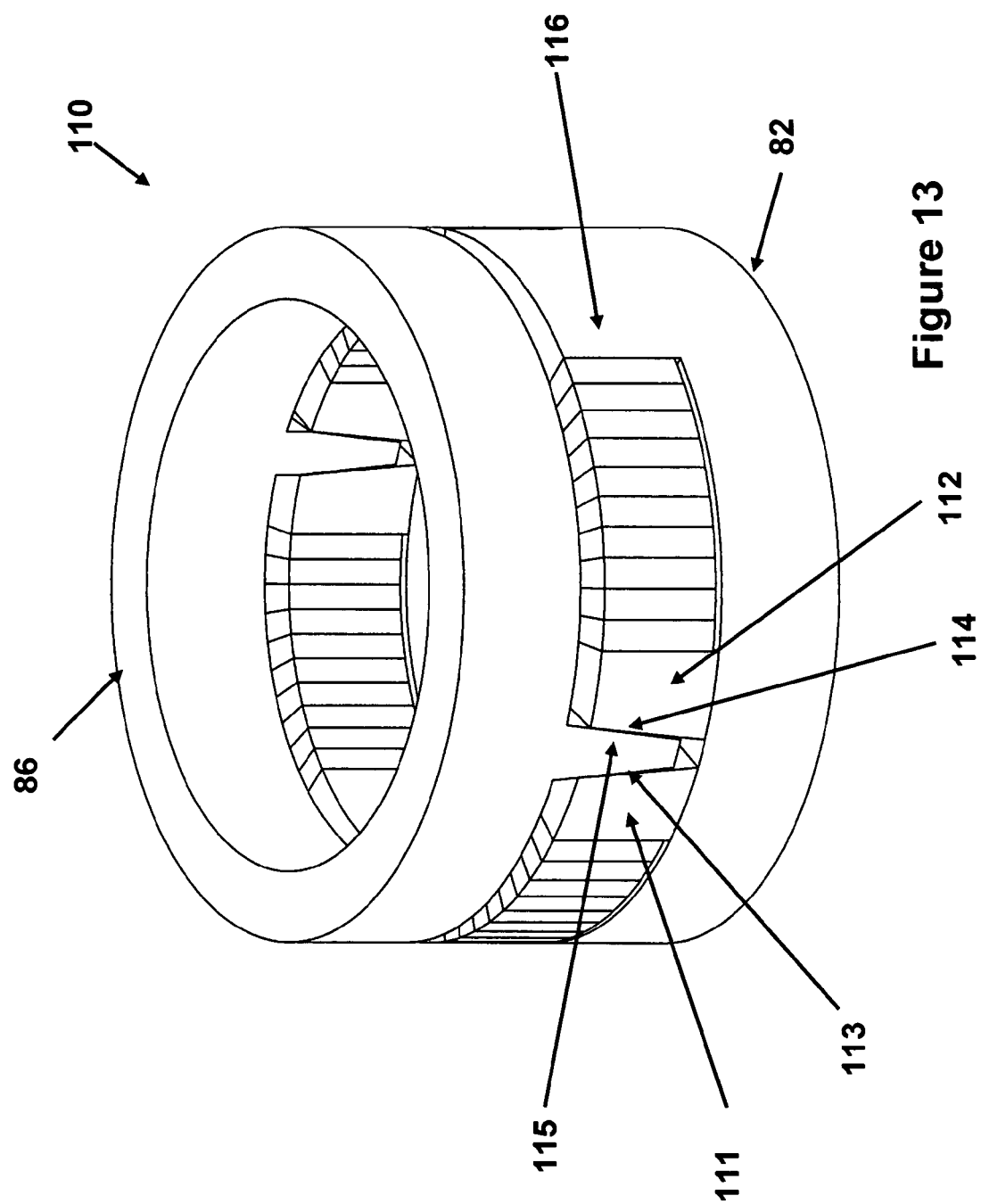
FIG. 13 illustrates a variation of the embodiment of the piezoelectric generator of FIG. 12

An alternative embodiment 110 to that shown in FIG. 12 is shown schematically in FIG. 13. A difference between the embodiments shown in FIG. 12 and FIG. 13 is the positioning and shape of the wedging elements on the two hollow cylindrical elements 82 and 86. In the embodiment 110, opposing end blocks 111 and 112 (replacing blocks 91 in the embodiment of FIG. 12) are provided with inclined surfaces 113 and 114, respectively. The wedging element 115, which is attached to the upper hollow cylinder 86, is provided with inclined surfaces on its either sides, which matches the inclined surface 113 and 114 as shown in FIG. 13. As the munitions structure 12 (FIG. 12) accelerates during the firing in the direction of the arrow 92 (FIG. 12), which is preferably parallel to the long axes of the cylinders 82 and 86, the firing acceleration acts on the mass of the upper hollow cylinder 86, and thereby wedging the elements 115 between the two blocks 113 and 114. As a result, compressive forces will be applied to the piezoelectric stacks 88 (FIG. 12). The present arrangement of the wedging surfaces eliminates rotational motion of the upper hollow cylinder 86 as it travels downward as is the case for the embodiment of FIG. 12. The compressive force (strain) acting on the piezoelectric stacks 88 generate electric charge in the piezoelectric stack layers, which can then be harvested and stored in certain storage device such as a capacitor or used directly to power, for example, certain electronic or electric devices.

In an alternative embodiment to that shown in FIG. 12 or 13, at least one elastic element such as spring washer (not shown) with relatively high spring rates is positioned between the piezoelectric stack 88 and the block 91 (111 and/or 112) and/or between the piezoelectric stack 88 and the supports 116 to increase the range of motion of the cam for the reasons described for the embodiment shown in FIG. 3. Alternatively, as it was previously described, the desired elasticity may be built into the structure of one or more components, such as in elements 111, 112, 115 and 116.

Figure 14:
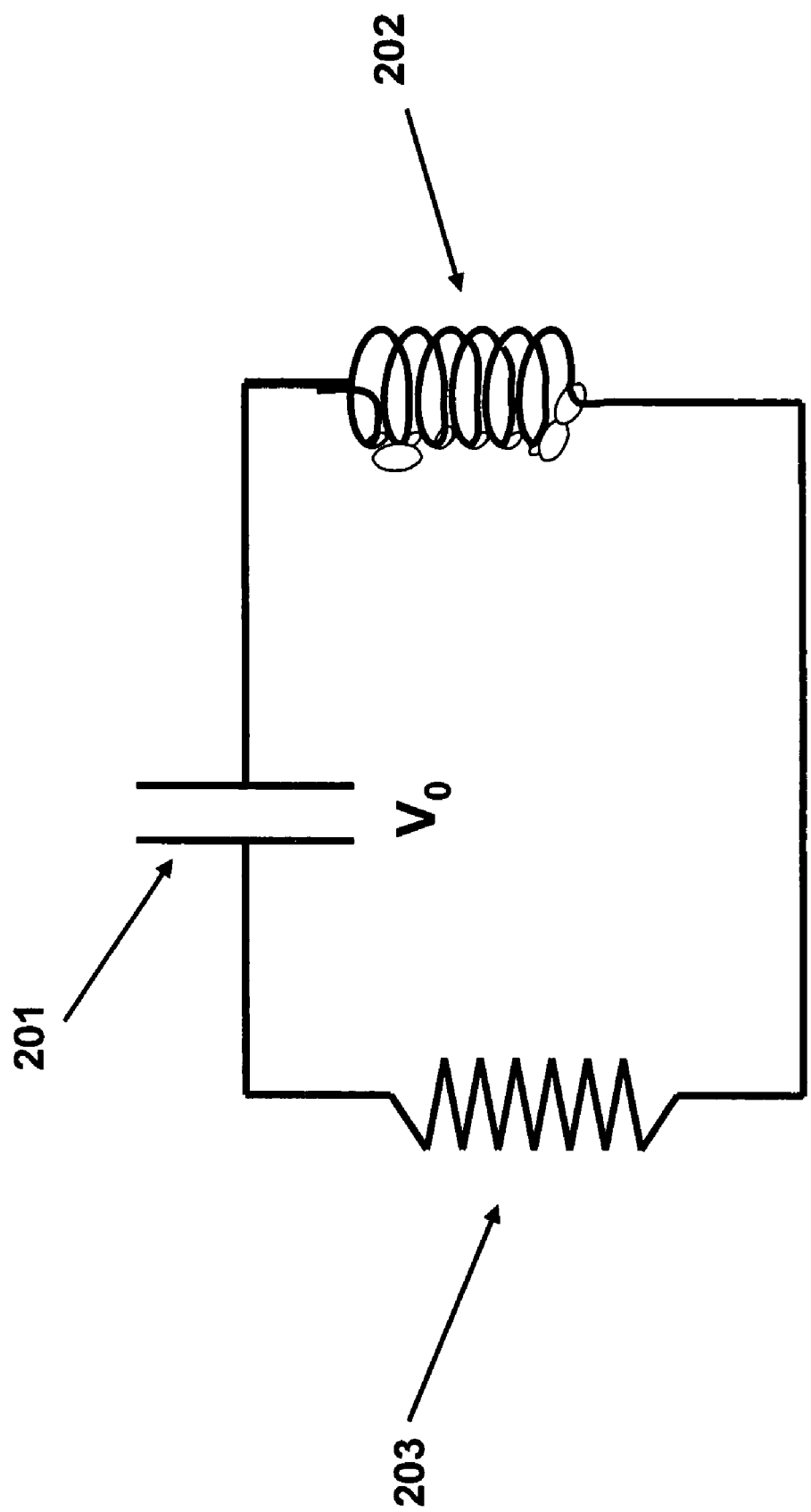
FIG. 14 illustrates a schematic circuit having a piezoelectric generator.

In the aforementioned methods of sustaining the strain in the piezoelectric elements due to the firing acceleration or other similar impact forces and the related embodiments shown in FIGS. 2-13, the generated charges in the piezoelectric element(s) can then be efficiently harvested over significantly longer periods of time as compared to the duration of the applied impact forces. Alternatively, noting that piezoelectric elements are capacitors and that the charges generated by the piezoelectric elements are stored in these capacitive elements, one may connect at least one inductance element to these capacitor elements to form an oscillating LC circuit as shown schematically in FIG. 14. In the schematic of FIG. 14, the capacitor element 201 represents the piezoelectric elements that are subjected to the aforementioned impact forces, the element 202 represents the inductance elements used in series with capacitors 201, and the resistance element 203 represents the unavoidable resistance of the above elements and the circuitry. The resistance element 203 is generally desired to be as low as possible to minimize losses in the electrical energy as the charges oscillate back and forth in the circuitry.

Figure 15:
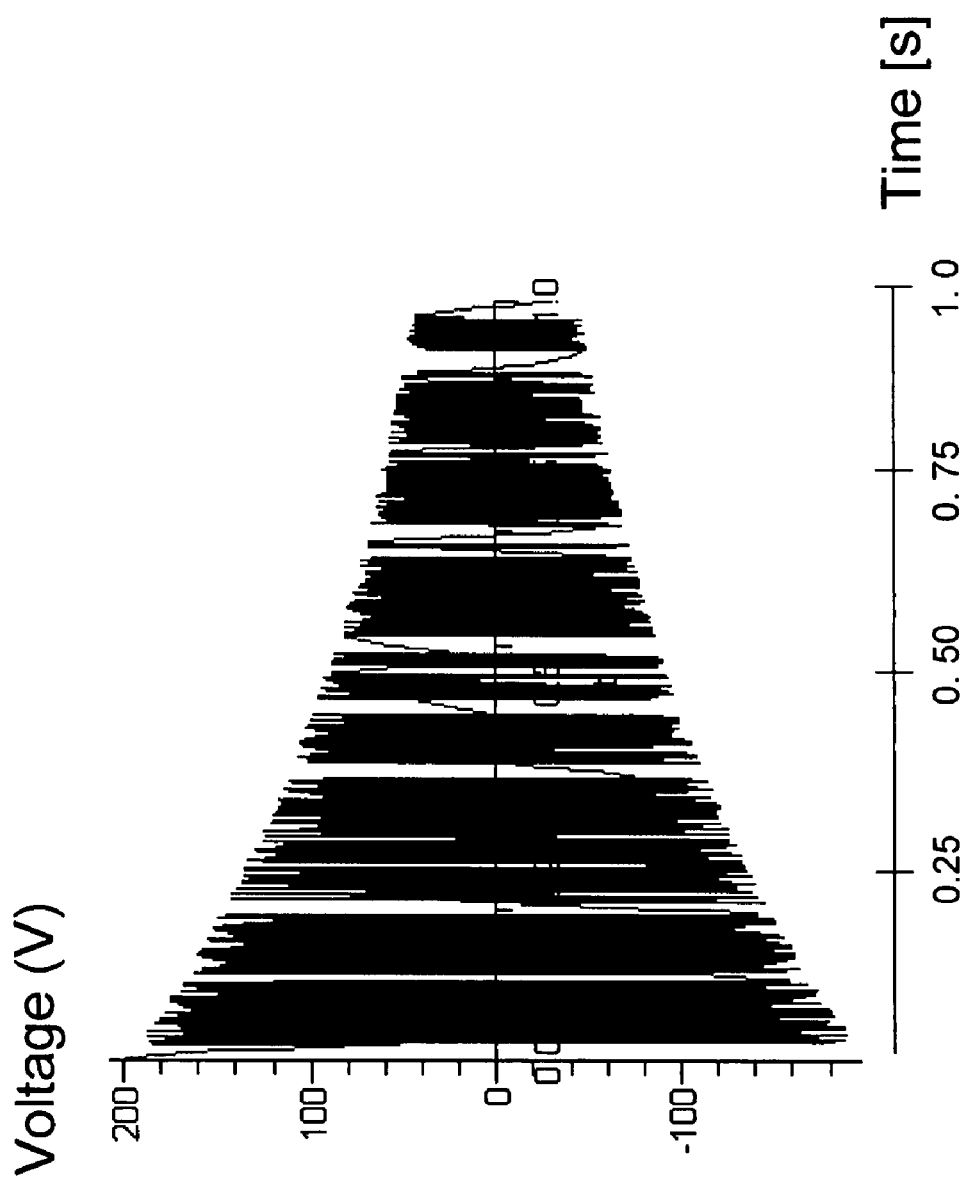
FIG. 15 illustrates an exemplary plot of voltage vs. time for a piezoelectric generator and circuitry of FIG. 14.

Once an oscillatory circuitry similar to that shown in FIG. 14 is constructed, then as the piezoelectric (capacitance) element 201 is strained, such as in compression as previously described, due to the firing acceleration or other similar impact forces, an initial charge is generated in the capacitance. The resulting charge with its corresponding voltage across the capacitance element 201 will then oscillate in the closed circuit shown schematically in FIG. 14. If it were possible to construct the circuitry with elements that did not have any inherent resistance to the follow of current, then the initiated oscillation would last indefinitely. In reality, the circuitry would provide resistance to the flow of current, which in the schematic of FIG. 14 is shown as a lumped resistance element 203. As a result, during each cycle of oscillation, certain amount of present electrical energy is converted into heat, depending on the amount of resistance of the element 203 and the level of current passing through the resistance element 203. In general, inductance elements with low internal resistance (usually the main portion of the total resistance 203) are available and can be used. For example, using a small piezoelectric stack element (a cylinder of about 10 mm diameter and 3 mm thick) with capacitance of C=760 nF, an inductance element with L=10000 µH with internal resistance of R=30 mΩ will provide an oscillatory circuitry (FIG. 14) with a frequency of oscillation of about ω=1825 Hz. If the applied firing acceleration or other similar impact force had generated a charge resulting in an initial voltage of 200 Volts, which is a typical voltage level for the above piezoelectric stack, then the resulting voltage oscillation across the piezoelectric element were simulated using a computer model of the circuitry, the plot of which is shown in FIG. 15. As can be seen, the oscillations die out very slowly, and if the charges are harvested over several hundred cycles of oscillations (100 cycles correspond to about 55 msec), then only a few percentage (less than 10%) of the energy is lost to heat.

In general, an energy collection circuitry (not shown in FIG. 14, and which are well known in the art) may harvest the electrical energy by connecting into the oscillatory circuitry of FIG. 14 at many locations as long as it does not interfere with the oscillatory operation of the circuitry. For example, the electrical energy harvesting electronics may be connected to the capacitance element to directly collect charges from this element as is well known in the art.

It is noted that one or more piezoelectric (capacitive) elements 201, additional capacitive and inductance elements may be connected in different circuitry to achieve different oscillatory circuitry as is well known in the art and the circuitry shown in FIG. 14 is only for the purpose of describing the basic method being disclosed.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A piezoelectric generator for generating power from an acceleration, the piezoelectric generator comprising:
   a piezoelectric member capable of producing an output power;
   means for applying a force to the piezoelectric member due to the acceleration; and
   means for sustaining a strain in the piezoelectric member resulting from the applied force;
   wherein the means for sustaining a strain in the piezoelectric member comprises configuring two or more components to have a locking frictional fit which is engaged upon the application of the force to the piezoelectric member and the two or more components comprises:
      a mass disposed to compress the piezoelectric member upon the acceleration, the mass having at least a first angled surface; and
      a locking member having at least a second angled surface in sliding contact with the first angled surface such that the mass and locking member engage to limit relative motion therebetween.

2. The piezoelectric generator of claim 1, wherein at least the mass is cylindrical having an internal opening.

3. The piezoelectric generator of claim 2, wherein the locking member is cylindrical having an internal opening common with the internal opening of the mass.

4. A piezoelectric generator for generating power from an acceleration, the piezoelectric generator comprising:
   a piezoelectric member capable of producing an output power;
   means for applying a force to the piezoelectric member due to the acceleration; and
   means for sustaining a strain in the piezoelectric member resulting from the applied force
   wherein the means for sustaining a strain in the piezoelectric member and the means for applying a force to the piezoelectric member comprise a rotatable cam member having a cam surface, wherein the cam rotates upon the acceleration such that the cam surface directly or indirectly contacts with the piezoelectric member to apply the force thereto and to limit any further relative movement between the surface and piezoelectric member.

5. The piezoelectric generator of claim 4, further comprising a mass eccentrically located from an axis of rotation of the cam for increasing an amount of the applied force on the piezoelectric member.

6. The piezoelectric generator of claim 4, further comprising an intermediate member disposed between the cam surface and the piezoelectric member.

* * * * *